United States Patent
Lees et al.

(10) Patent No.: US 8,798,386 B2
(45) Date of Patent: Aug. 5, 2014

(54) METHOD AND SYSTEM FOR PROCESSING IMAGE DATA ON A PER TILE BASIS IN AN IMAGE SENSOR PIPELINE

(75) Inventors: Adrian Lees, Bar Hill (GB); David Plowman, Great Chesterford (GB)

(73) Assignee: Broadcom Corporation, Irvine, CA (US)

( * ) Notice: Subject to any disclaimer, the term of this patent is extended or adjusted under 35 U.S.C. 154(b) by 349 days.

(21) Appl. No.: 12/835,522

(22) Filed: Jul. 13, 2010

(65) Prior Publication Data
US 2011/0261061 A1 Oct. 27, 2011

Related U.S. Application Data

(60) Provisional application No. 61/326,849, filed on Apr. 22, 2010.

(51) Int. Cl.
| | |
|---|---|
| G06K 9/40 | (2006.01) |
| G06K 9/20 | (2006.01) |
| G06K 9/60 | (2006.01) |
| G06F 13/14 | (2006.01) |
| G06F 15/00 | (2006.01) |
| G06F 15/76 | (2006.01) |
| G06F 7/38 | (2006.01) |
| G06F 15/78 | (2006.01) |
| G06F 9/38 | (2006.01) |
| G06F 9/44 | (2006.01) |
| G06T 1/20 | (2006.01) |
| G06F 9/445 | (2006.01) |

(52) U.S. Cl.
CPC .......... *G06F 15/7885* (2013.01); *G06F 9/3867* (2013.01); *G06F 2212/17* (2013.01); *G06F 2212/171* (2013.01); *G06F 2009/44531* (2013.01); *G06F 9/4405* (2013.01); *G06T 1/20* (2013.01); *G06T 2207/10004* (2013.01); *G06T 2207/20021* (2013.01); *G06T 2210/52* (2013.01)

USPC ........... 382/254; 382/282; 382/303; 345/519; 712/15; 712/21; 708/233

(58) Field of Classification Search
USPC ........... 345/501–506, 519; 712/10–22; 708/3, 708/5, 100, 200, 230–233
See application file for complete search history.

(56) References Cited

U.S. PATENT DOCUMENTS

| | | | | |
|---|---|---|---|---|
| 8,041,137 | B2 * | 10/2011 | Swann | 382/254 |
| 2003/0002746 | A1 * | 1/2003 | Kusaka | 382/255 |

(Continued)

OTHER PUBLICATIONS

Khailany, B.K.; Williams, T.; Lin, J.; Long, E.P.; Rygh, M.; Tovey, D.W.; Dally, W.J., "A Programmable 512 GOPS Stream Processor for Signal, Image, and Video Processing," Solid-State Circuits, IEEE Journal of, vol. 43, No. 1, pp. 202,213, Jan. 2008.*

(Continued)

*Primary Examiner* — Randolph I Chu
*Assistant Examiner* — Nathan Bloom
(74) *Attorney, Agent, or Firm* — Brinks Gilson & Lione

(57) ABSTRACT

Methods and systems for processing image data on a per tile basis in an image sensor pipeline (ISP) are disclosed and may include communicating, to one or more processing modules via control logic circuits integrated in the ISP, corresponding configuration parameters that are associated with each of a plurality of data tiles comprising an image. The ISP may be integrated in a video processing core. The plurality of data tiles may vary in size. A processing complete signal may be communicated to the control logic circuits when the processing of each of the data tiles is complete prior to configuring a subsequent processing module. The processing may comprise one or more of: lens shading correction, statistics, distortion correction, demosaicing, denoising, defective pixel correction, color correction, and resizing. Each of the data tiles may overlap with adjacent data tiles, and at least a portion of them may be processed concurrently.

22 Claims, 9 Drawing Sheets

(56) References Cited

U.S. PATENT DOCUMENTS

| | | | |
|---|---|---|---|
| 2008/0122851 A1* | 5/2008 | Bakalash et al. | 345/505 |
| 2008/0219588 A1* | 9/2008 | Swann | 382/276 |
| 2008/0292132 A1* | 11/2008 | Plowman et al. | 382/100 |
| 2008/0292216 A1* | 11/2008 | Walker et al. | 382/298 |
| 2008/0292219 A1* | 11/2008 | Keall et al. | 382/313 |
| 2009/0077359 A1* | 3/2009 | Chakravarthula et al. | 712/229 |
| 2009/0232347 A9* | 9/2009 | Plowman et al. | 382/100 |
| 2011/0034176 A1* | 2/2011 | Lord et al. | 455/450 |
| 2011/0148901 A1* | 6/2011 | Adams et al. | 345/589 |
| 2011/0216069 A1* | 9/2011 | Keall et al. | 345/441 |
| 2011/0221743 A1* | 9/2011 | Keall et al. | 345/419 |
| 2011/0227920 A1* | 9/2011 | Adams et al. | 345/426 |
| 2011/0242113 A1* | 10/2011 | Keall et al. | 345/505 |

OTHER PUBLICATIONS

Amano, Hideharu. "A survey on dynamically reconfigurable processors." IEICE transactions on Communications 89.12 (2006): 3179-3187.*

Diana Göhringer, Thomas Perschke, Michael Hübner, and Jürgen Becker, "A Taxonomy of Reconfigurable Single-/Multiprocessor Systems-on-Chip," International Journal of Reconfigurable Computing, vol. 2009, Article ID 395018, 11 pages, 2009. doi:10.1155/2009/395018.*

Dorta, Taho, et al. "Reconfigurable multiprocessor systems: a review." International Journal of Reconfigurable Computing 2010 (2010): 7.*

* cited by examiner

METHOD AND SYSTEM FOR PROCESSING IMAGE DATA ON A PER TILE BASIS IN AN IMAGE SENSOR PIPELINE

CROSS-REFERENCE TO RELATED APPLICATIONS/INCORPORATION BY REFERENCE

This application makes reference to, claims the benefit from, and claims priority to U.S. Provisional Application Ser. No. 61/326,849 filed on Apr. 22, 2010.

This application also makes reference to U.S. patent application Ser. No. 11/867,292 filed on Oct. 4, 2007 and 11/682,536 filed on Mar. 6, 2007.

Each of the above stated applications is hereby incorporated herein by reference in its entirety.

FEDERALLY SPONSORED RESEARCH OR DEVELOPMENT

[Not Applicable]

MICROFICHE/COPYRIGHT REFERENCE

[Not Applicable]

FIELD OF THE INVENTION

Certain embodiments of the invention relate to data processing. More specifically, certain embodiments of the invention relate to processing image data on a per tile basis in an image sensor pipeline.

BACKGROUND OF THE INVENTION

Cellular phones have developed from large, expensive devices typically used only in cars and owned only by a small percentage of the population to miniature, inexpensive, and ubiquitous handheld devices, and are even more numerous than traditional land-line phones in countries with poor fixed-line infrastructure. Cellular handsets have incorporated text messaging, email, connection to the Internet, PDAs, and even personal computers.

Cellular phones with built-in cameras, or camera phones, have become prevalent in the mobile phone market, due to the low cost of CMOS image sensors and the ever increasing customer demand for more advanced cellular phones. As camera phones have become more widespread, their usefulness has been demonstrated in many applications, such as casual photography, but have also been utilized in more serious applications such as crime prevention, recording crimes as they occur, and news reporting.

Historically, the resolution of camera phones has been limited in comparison to typical digital cameras, due to the fact that they must be integrated into the small package of a cellular handset, limiting both the image sensor and lens size. In addition, because of the stringent power requirements of cellular handsets, large image sensors with advanced processing have been difficult to incorporate. However, due to advancements in image sensors, multimedia processors, and lens technology, the resolution of camera phones has steadily improved rivaling that of many digital cameras.

Further limitations and disadvantages of conventional and traditional approaches will become apparent to one of skill in the art, through comparison of such systems with the present invention as set forth in the remainder of the present application with reference to the drawings.

BRIEF SUMMARY OF THE INVENTION

A system and/or method for processing image data on a per tile basis in an image sensor pipeline, substantially as shown in and/or described in connection with at least one of the figures, as set forth more completely in the claims.

Various advantages, aspects and novel features of the present invention, as well as details of an illustrated embodiment thereof, will be more fully understood from the following description and drawings.

DETAILED DESCRIPTION OF THE INVENTION

Certain aspects of the invention may be found in a method and system for processing image data on a per tile basis in an image sensor pipeline (ISP). Exemplary aspects of the invention may comprise communicating, to one or more processing modules via control logic circuits integrated in the ISP, corresponding configuration parameters that are associated with each one of a plurality of data tiles comprising an image. Each of the plurality of data tiles may be processed utilizing corresponding configuration parameters. The ISP may be integrated in a chip or an integrated circuit, wherein the ISP comprises the control logic circuits and one or more image processing modules that are communicatively coupled to the control logic circuits. The ISP may be integrated in a video processing core. The one or more processing modules comprising one or more image processing modules, the control logic circuits, the ISP, and the video processing core may be integrated on a single substrate of the chip or integrated circuit.

The plurality of data tiles may vary in size. A processing complete signal may be communicated to the control logic circuits when the processing of the each one of the plurality of data tiles is complete and prior to configuring the processing modules for the next data tile. The processing of the plurality of data tiles may comprise one or more of: lens shading correction, statistics, distortion correction, demosaicing, denoising, defective pixel correction, color correction, and resizing. Each of the plurality of data tiles may overlap with adjacent data tiles. At least a portion of the plurality of data tiles may be processed concurrently. A portion of the plurality of data tiles may be communicated to one or more processing modules external to the ISP for further processing by hardware and/or software, and may then be reinserted into the ISP at any point in the ISP independent of where the tile was communicated from in the ISP.

Figure 1A:
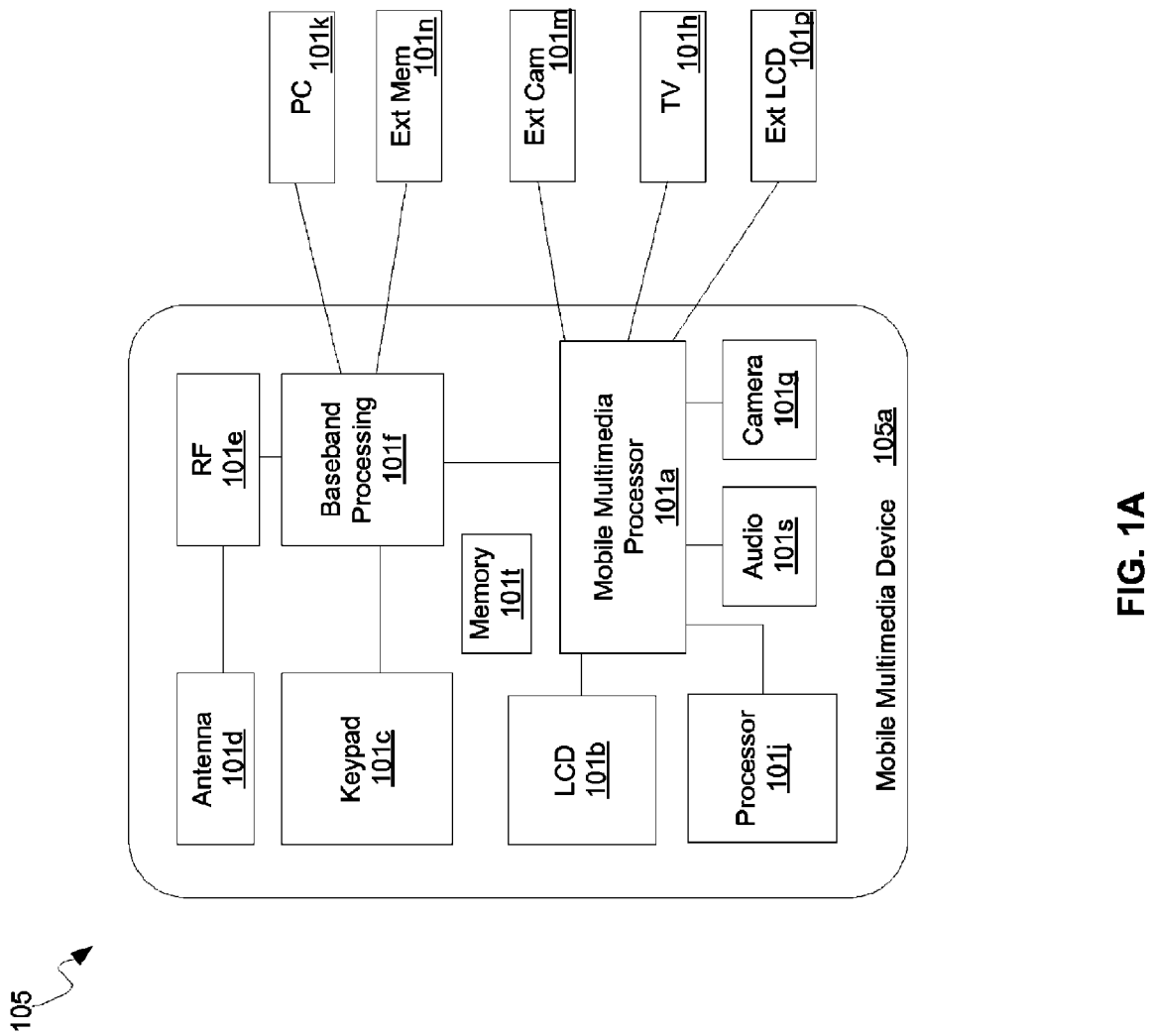
FIG. 1A is a block diagram of an exemplary mobile multimedia system that may be operable to process image data on a per tile basis in an image sensor pipeline, in accordance with an embodiment of the invention.

FIG. 1A is a block diagram of an exemplary mobile multimedia system that may be operable to process image data on a per tile basis in an image sensor pipeline, in accordance with an embodiment of the invention. Referring to FIG. 1A, there is shown a mobile multimedia system 105 that comprises a mobile multimedia device 105a, a TV 101h, a PC 101k, an external camera 101m, external memory 101n, and external LCD display 101p. The mobile multimedia device 105a may be a cellular telephone or other handheld communication device. The mobile multimedia device 105a may comprise a mobile multimedia processor (MMP) 101a, an antenna 101d, an audio block 101s, a radio frequency (RF) block 101e, a baseband processing block 101f, an LCD display 101b, a keypad 101c, and a camera 101g.

The MMP 101a may comprise suitable circuitry, logic, and/or code and may be adapted to perform image, video and/or multimedia processing for the mobile multimedia device 105a. The MMP 101a may further comprise a plurality of processor cores. The MMP 101a may also comprise integrated interfaces, which may be utilized to support one or more external devices coupled to the mobile multimedia device 105a. For example, the MMP 101a may support connections to a TV 101h, an external camera 101m, and an external LCD display 101p.

In operation, the mobile multimedia device may receive signals via the antenna 101d. Received signals may be processed by the RF block 101e and the RF signals may be converted to baseband by the baseband processing block 101f. Baseband signals may then be processed by the MMP 101a. Audio, and/or video data may be received from the external camera 101m, and image data may be received via the integrated camera 101g. During processing, the MMP 101a may utilize the external memory 101n for storing of processed data. Image data may be processed in tile format, which may reduce the memory requirements for buffering of data during processing. Conventional systems may process a plurality of entire lines of data, which may create excessive memory requirements for larger image sensors, with greater than 1 megapixel, for example. Processed audio data may be communicated to the audio block 101s and processed video data may be communicated to the LCD 101b or the external LCD 101p, for example. The keypad 101c may be utilized for communicating processing commands and/or other data, which may be required for audio or video data processing by the MMP 101a.

Figure 1B:
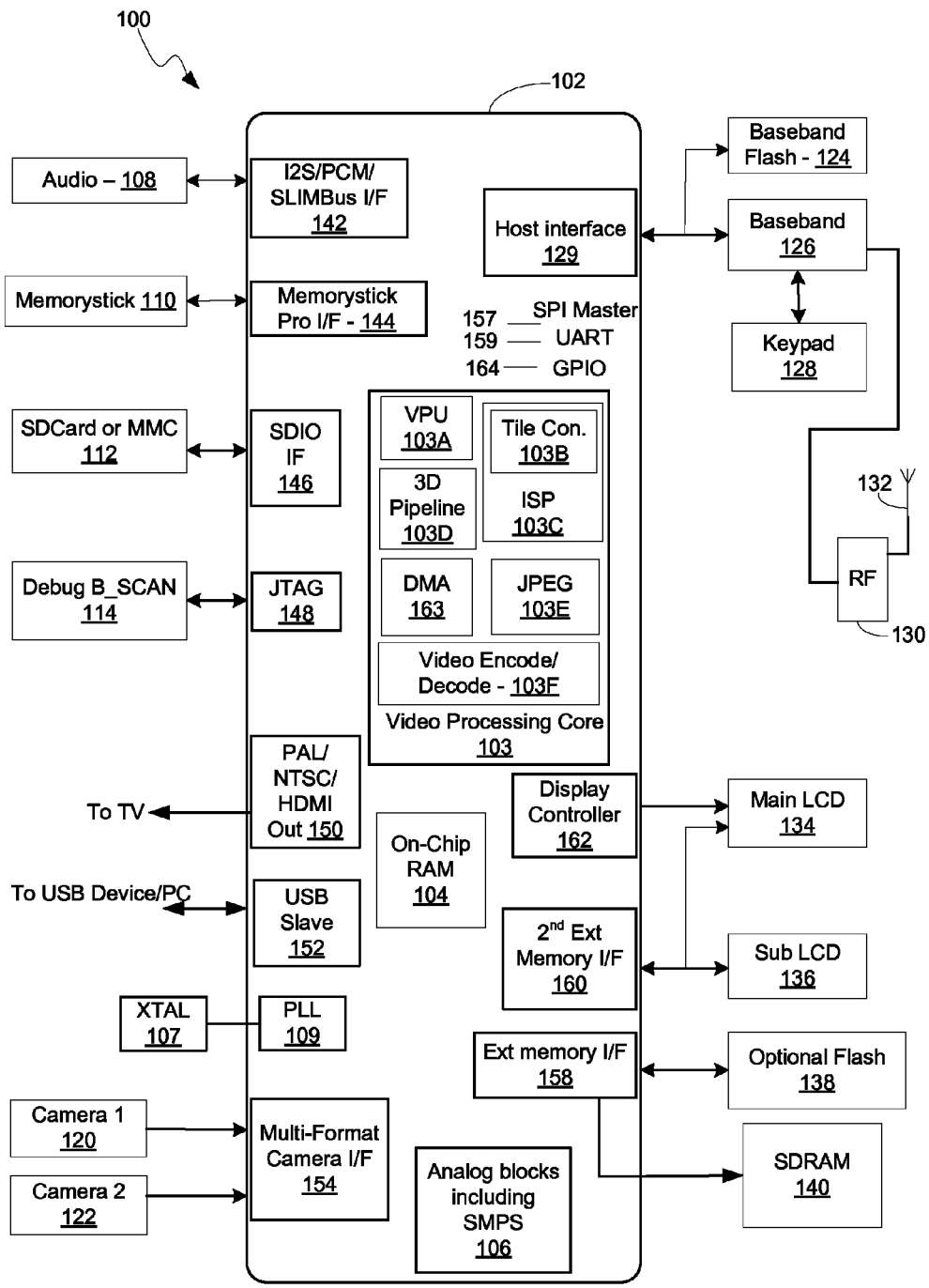
FIG. 1B is a block diagram of an exemplary mobile multimedia processor that may be operable to process image data on a per tile basis in an image sensor pipeline, in accordance with an embodiment of the invention.

FIG. 1B is a block diagram of an exemplary mobile multimedia processor that may be operable to process image data on a per tile basis in an image sensor pipeline, in accordance with an embodiment of the invention. Referring to FIG. 1B, the mobile multimedia processor 102 may comprise suitable logic, interfaces, circuitry and/or code that may be adapted to perform video and/or multimedia processing for handheld multimedia products. For example, the mobile multimedia processor 102 may be designed and optimized for video record/playback, mobile TV and 3D mobile gaming, utilizing integrated peripherals and a video processing core. The mobile multimedia processor 102 may a comprise vector processing unit (VPU) 103A, an image sensor pipeline (ISP) 103C, a 3D pipeline 103D, on-chip RAM 104, an analog block 106, a direct memory access (DMA) controller 163, an audio interface (I/F) 142, a memory stick I/F 144, SD card I/F 146, JTAG I/F 148, TV output I/F 150, USB I/F 152, a camera I/F 154, and a host I/F 129. The ISP 103C may comprise tile control logic 103B. The mobile multimedia processor 102 may further comprise a serial peripheral interface (SPI) 157, a universal asynchronous receiver/transmitter (UART) I/F 159, general purpose input/output (GPIO) pins 164, a display controller 162, an external memory I/F 158, and a second external memory I/F 160.

The VPU 103A may comprise suitable circuitry, logic, interfaces, and/or code that may be operable to perform video and/or graphics processing of data. In an embodiment of the invention, the VPU 103A may comprise a plurality of processor cores, thereby enabling parallel processing of data as needed. The on-chip RAM 104 and the SDRAM 140 may comprise suitable logic, circuitry and/or code that may be adapted to store data such as image or video data.

The tile control logic 103B may comprise suitable circuitry, logic, interfaces, and/or code that may be operable to control the configuration of modules within the ISP 103C corresponding to each image data tile as it proceeds through the ISP 103C. In this manner, each module may be individually configured to increase processing speed and performance.

The image sensor pipeline (ISP) 103C may comprise suitable circuitry, logic, interfaces, and/or code that enables the processing of image data. The ISP 103C may perform one or more of a plurality of processing techniques, including those from a group comprising filtering, demosaic, lens shading correction, defective pixel correction, white balance, image compensation, Bayer interpolation, color transformation, and/or post filtering, for example. Other processing techniques are also possible and may be performed by or in the ISP 103C. The processing of image data may be performed on variable sized tiles, reducing the memory requirements of the ISP 103C processes.

Each tile may have corresponding configuration data for each of the relevant processing modules in the ISP 103C. Control logic in the multi-media processor 102 may be operable to communicate the appropriate configuration data to the modules in the ISP 103C as each tile progresses through the ISP 103C, and may also receive a data processing complete signal back from the modules in the ISP 103C indicating that the configuration data for the next tile may be communicated to that particular module. Accordingly, the processing modules in the ISP 103C may process a particular tile concurrently, thereby reducing storage requirements in the ISP 103C.

The 3D pipeline 103D may comprise suitable circuitry, logic, interfaces, and/or code that may be operable to process video data. The 3D pipeline 103D may perform a plurality of processing techniques comprising vertex processing, rasterizing, early-Z culling, interpolation, texture lookups, pixel shading, depth test, stencil operations and color blend, for example.

The analog block 106 may comprise a switch mode power supply (SMPS) block and a phase locked loop (PLL) block. In addition, the analog block 106 may comprise an on-chip SMPS controller, which may be operable to generate its core voltage. The core voltage may be software programmable according to, for example, speed demands on the mobile multimedia processor 102, allowing further control of power management.

The analog block 106 may also comprise a plurality of PLLs that may be adapted to generate 195 kHz-200 MHz clocks, for example, for external devices. Other voltages and clock speeds may be utilized depending on the type of application. The mobile multimedia processor 102 may comprise a plurality of power modes of operation, for example, run, sleep, hibernate and power down. In accordance with an embodiment of the invention, the mobile multimedia processor 102 may comprise a bypass mode that may allow a host to access memory mapped peripherals in power down mode, for example. In bypass mode, the mobile multimedia processor 102 may be adapted to directly control the display during normal operation while giving a host the ability to maintain the display during standby mode.

The audio block 108 may comprise suitable logic, circuitry, interfaces, and/or code that may be operable to communicate with the mobile multimedia processor 102 via an inter-IC sound ($I^2S$), pulse code modulation (PCM) or audio codec (AC'97) interface 142 or other suitable interface, for example. In the case of an AC'97 and/or an $I^2S$ interface, suitable audio controller, processor and/or circuitry may be adapted to provide AC'97 and/or $I^2S$ audio output respectively, in either master or slave mode. In the case of the PCM interface, a suitable audio controller, processor and/or circuitry may be operable to allow input and output of telephony or high quality stereo audio. The PCM audio controller, processor and/or circuitry may comprise independent transmit and receive first in first out (FIFO) buffers and may use DMA to further reduce processor overhead. The audio block 108 may also comprise an audio in, audio out port and a speaker/microphone port (not illustrated in FIG. 1B).

The mobile multimedia device 100 may comprise at least one portable memory input/output (I/O) block. In this regard, the memorystick block 110 may comprise suitable logic, circuitry and/or code that may be adapted to communicate with the mobile multimedia processor 102 via a memorystick pro interface 144, for example. The SD card block 112 may comprise suitable logic, circuitry and/or code that may be adapted to communicate with the mobile multimedia processor 102 via a SD input/output (I/O) interface 146, for example. A multimedia card (MMC) may also be utilized to communicate with the mobile multimedia processor 102 via the SD input/output (I/O) interface 146, for example. The mobile multimedia device 100 may comprise other portable memory I/O blocks such an xD I/O card.

The debug block 114 may comprise suitable logic, circuitry, interfaces, and/or code that may be adapted to communicate with the mobile multimedia processor 102 via a joint test action group (JTAG) interface 148, for example. The debug block 114 may be adapted to access the address space of the mobile multimedia processor 102 and may be adapted to perform boundary scans via an emulation interface. Other test access ports (TAPs) may be utilized. The phase alternate line (PAL)/national television standards committee (NTSC)/HDMI TV output I/F 150 may be utilized for communication with a TV, and the universal serial bus (USB) 1.1, or other variant thereof, slave port I/F 152 may be utilized for communications with a PC, for example. The cameras 120 and/or 122 may comprise suitable logic, circuitry, interfaces, and/or code that may be adapted to communicate with the mobile multimedia processor 102 via a multiformat raw CCIR 601 camera interface 154, for example. The camera I/F 154 may utilize windowing and sub-sampling functions, for example, to connect the mobile multimedia processor 102 to a mobile TV front end.

The mobile multimedia processor 102 may also comprise a plurality of serial interfaces, such as the USB I/F 152, a serial peripheral interface (SPI) 157, and a universal asynchronous receiver/transmitter (UART) I/F 159 for Bluetooth or IrDA. The SPI master interface 157 may comprise suitable circuitry, logic, interfaces, and/or code that may be operable to control image sensors. Two chip selects may be provided, for example, to work in a polled mode with interrupts or via a DMA controller 163. Furthermore, the mobile multimedia processor 102 may comprise a plurality of general purpose I/O (GPIO) pins 164, which may be utilized for user defined I/O or to connect to the internal peripherals. The display controller 162 may comprise suitable circuitry, logic, interfaces, and/or code that may be operable to support multiple displays with XGA resolution, for example, and to handle 8/9/16/18/21-bit video data.

The mobile multimedia processor 102 may be connected via an 8/16 bit parallel host interface 129 to the same bus as the baseband processing block 126 uses to access the baseband flash memory 124. The host interface 129 may be adapted to provide two channels with independent address and data registers through which a host processor may read and/or write directly to the memory space of the mobile multimedia processor 102. The baseband processing block 126 may comprise suitable logic, circuitry, interfaces, and/or code that may be operable to convert RF signals to baseband and communicate the baseband processed signals to the mobile multimedia processor 102 via the host interface 129, for example. The RF processing block 130 may comprise suitable logic, circuitry, interfaces, and/or code that may be operable to receive signals via the antenna 132 and to communicate RF signals to the baseband processing block 126. The host interface 129 may comprise a dual software channel with a power efficient bypass mode.

The main LCD 134 may be adapted to receive data from the mobile multimedia processor 102 via a display controller 162 and/or from a second external memory interface 160, for example. The display controller 162 may comprise suitable logic, circuitry, interfaces, and/or code that may be operable to drive an internal TV out function or be connected to a range of LCD's. The display controller 162 may be operable to support a range of screen buffer formats and may utilize direct memory access (DMA) to access the buffer directly and increase video processing efficiency of the video processing cores 103A and 103B. Both NTSC and PAL raster formats may be generated by the display controller 162 for driving the TV out. Other formats, for example SECAM, may also be supported.

In one embodiment of the invention, the display controller 162 may be operable to support a plurality of displays, such as an interlaced display, for example a TV, and/or a non-interlaced display, such as an LCD. The display controller 162 may also recognize and communicate a display type to the DMA controller 163. In this regard, the DMA controller 163 may fetch video data in an interlaced or non-interlaced fashion for communication to an interlaced or non-interlaced display coupled to the mobile multimedia processor 102 via the display controller 162.

The subsidiary LCD 136 may comprise suitable logic, circuitry, interfaces, and/or code that may be operable to communicate with the mobile multimedia processor 102 via a second external memory interface 160, for example. The subsidiary LCD 136 may be used on a clamshell phone where the main LCD 134 may be inside and the subsidiary LCD 136 may be outside, for example. The mobile multimedia processor 102 may comprise a RGB external data bus. The mobile multimedia processor 102 may be adapted to scale image output with pixel level interpolation and a configurable refresh rate.

The optional flash memory 138 may comprise suitable logic, circuitry, interfaces, and/or code that may be operable to communicate with the mobile multimedia processor 102 via an external memory interface 158, for example. The SDRAM 140 may comprise suitable logic, circuitry, interfaces, and/or code that may be operable to receive data from the mobile multimedia processor 102 via the external memory I/F 158, for example. The external memory I/F 158 may be utilized by the mobile multimedia processor 102 to connect to the SDRAM 140, Flash memory 138, and/or external peripherals, for example. Control and timing information for the SDRAM 140 and other asynchronous devices may be configurable by the mobile multimedia processor 102.

The mobile multimedia processor 102 may further comprise a secondary memory interface 160 to connect to connect to memory-mapped LCD and external peripherals, for example. The secondary memory interface 160 may comprise suitable circuitry, logic, interfaces, and/or code and may be utilized to connect the mobile multimedia processor 102 to slower devices without compromising the speed of external memory access. The secondary memory interface 160 may provide 16 data lines, for example, 6 chip select/address lines, and programmable bus timing for setup, access and hold times, for example. The mobile multimedia processor 102 may be adapted to provide support for NAND/NOR Flash including NAND boot and high speed direct memory access (DMA), for example.

In operation, the mobile multimedia processor 102 may be operable to process image data in a tile format. The tiles may be varied in size, depending on the type of image data in that particular part of the image. Processing may be performed by the ISP 103C with parameter control by the tile control logic 103B. The on-chip RAM 104 and the SDRAM 140 may be utilized to store data during processing.

By processing data in tiles, the memory requirements for image processing may be reduced. In this manner, image processing may begin earlier and on smaller arrays of data, as opposed to waiting for a plurality of entire rows of the image data, as in conventional systems. The size of the tiles may be smaller in areas of the image where image distortion may be higher due to the image sensor optics in the cameras 120 and 122, around the edges, for example. Conversely, the tile size may be larger in areas where distortion may be lower, such as in the center of the image, for example.

In an embodiment of the invention, each image data tile may have corresponding configuration data for each of the relevant processing modules in the ISP 103C. The tile control logic 103B may be operable to communicate the appropriate configuration data to the modules in the ISP 103C as each tile progresses through the ISP 103C. The tile control logic 103B may also be operable to receive a data processing complete signal back from the modules in the ISP 103C indicating that the configuration data for the next tile may be communicated to the appropriate processing modules.

Figure 2A:
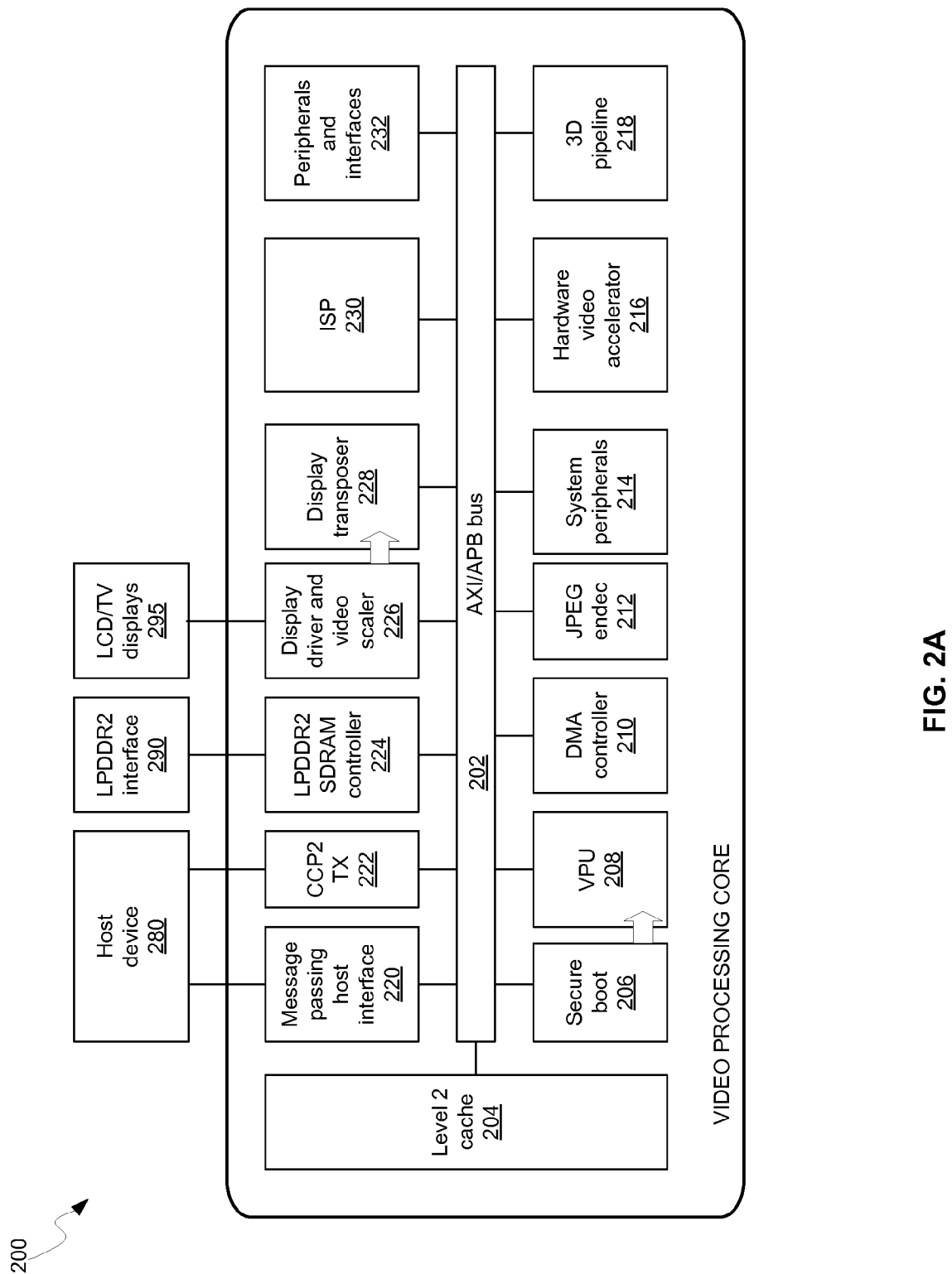
FIG. 2A is a block diagram that illustrates an exemplary video processing core architecture that may be operable to process multimedia data on a per tile basis in an image sensor pipeline, in accordance with an embodiment of the invention.

FIG. 2A is a block diagram that illustrates an exemplary video processing core architecture that may be operable to process multimedia data on a per tile basis in an image sensor pipeline, in accordance with an embodiment of the invention. Referring to FIG. 2A, there is shown a video processing core 200 comprising suitable logic, circuitry, interfaces, and/or code that may be operable to perform high performance video processing. The architecture of the video processing core 200 may be configured to provide a flexible, low power, and high performance multimedia solution for a wide range of applications, including mobile applications, for example. By using dedicated hardware pipelines in the architecture of the video processing core 200, such low power consumption and high performance goals may be achieved. The video processing core 200 may correspond to, for example, the video processing core 103 described above with respect to FIG. 1B.

The architecture of the video processing core 200 may be configured based on various applications, features and/or capabilities provide by a host device. For example, the video processing core 200 may be configured to support multiple capabilities, comprising image sensor processing, high rate (e.g., 30 frames-per-second) high definition (e.g., 1080p) video encoding and decoding, three-dimensional (3D) graphics, high speed Joint Photographic Experts Group (JPEG) encode and decode, audio codecs, image scaling, and/or liquid crystal display (LCD) and television (TV) outputs, for example.

In one exemplary embodiment of the invention, the video processing core 200 may comprise an Advanced eXtensible Interface/Advanced Peripheral (AXI/APB) bus 202, a level 2 cache 204, a secure boot 206, a Vector Processing Unit (VPU) 208, a direct memory access (DMA) controller 210, a JPEG encoder/decoder (endec) 212, a systems peripherals block 214, a message passing host interface 220, a Compact Camera Port 2 (CCP2) transmitter (TX) 222, a Low-Power Double-Data-Rate 2 Synchronous Dynamic Random Access Memory (LPDDR2 SDRAM) controller 224, a display driver and video scaler 226, and a display transposer 228. The video processing core 200 may also comprise an image sensor pipeline (ISP) 230, a hardware video accelerator 216, a 3D pipeline 218, and peripherals and interfaces 232. In other embodiments of the video processing core 200, however, fewer or more components than those described above may be included.

In one embodiment of the invention, the VPU 208, the ISP 230, the 3D pipeline 218, the JPEG endec 212, the DMA controller 210, and/or the hardware video accelerator 216, may correspond to the VPU 103A, the ISP 103C, the 3D pipeline 103D, the JPEG 103E, the DMA 163, and/or the video encode/decode 103F described above with respect to FIG. 1B.

Coupled to the video processing core 200 may be a host device 280, an LPDDR2 interface 290, and/or LCD/TV displays 295. The host device 280 may comprise a processor, such as a microprocessor or Central Processing Unit (CPU), microcontroller, Digital Signal Processor (DSP), or other like processor, for example. In some embodiments of the invention, the host device 280 may correspond to the processor 101j described above with respect to FIG. 1A. The LPDDR2 interface 290 may comprise suitable logic, circuitry, interfaces, and/or code that may be operable to allow communication between the LPDDR2 SDRAM controller 224 and memory. The LCD/TV displays 295 may comprise one or more displays (e.g., panels, monitors, screens, cathode-ray tubes (CRTs)) for displaying image and/or video information. In some embodiments of the invention, the LCD/TV displays 295 may correspond to one or more of the TV 101h and the external LCD 101p described above with respect to FIG. 1A, and the main LCD 134 and the sub LCD 136 described above with respect to FIG. 1B.

The message passing host interface 220 and the CCP2 TX 222 may comprise suitable logic, circuitry, interfaces, and/or code that may be operable to allow data and/or instructions to be communicated between the host device 280 and one or more components in the video processing core 200. The data communicated may comprise image and/or video data, for example. In this regard, the CCP2 TX 222 may be operable to communicate high speed differential signaling comprising data generated by the image sensor processor (ISP) 230 to the host device 280.

The LPDDR2 SDRAM controller 224 and the DMA controller 210 may comprise suitable logic, circuitry, interfaces, and/or code that may be operable to control access to memory by one or more components and/or processing modules in the video processing core 200.

The VPU 208 may comprise suitable logic, circuitry, interfaces, and/or code that may be operable for data processing while maintaining high throughput and low power consumption. The VPU 208 may provide flexibility in the video processing core 200 such that software routines, for example, may be inserted into the processing pipeline. The VPU 208 may comprise dual scalar cores and a vector core, for example. The dual scalar cores may use a Reduced Instruction Set Computer (RISC)-style scalar instruction set and the vector core may use a vector instruction set, for example. Scalar and vector instructions may be executed in parallel.

Although not shown in FIG. 2A, the VPU 208 may comprise one or more Arithmetic Logic Units (ALUs), a scalar data bus, a scalar register file, one or more Pixel-Processing Units (PPUs) for vector operations, a vector data bus, a vector register file, a Scalar Result Unit (SRU) that may operate on one or more PPU outputs to generate a value that may be provided to a scalar core. Moreover, the VPU 208 may comprise its own independent level 1 instruction and data cache.

The ISP 230 may comprise suitable logic, circuitry, interfaces, and/or code that may be operable to provide hardware accelerated processing of data received from an image sensor (e.g., charge-coupled device (CCD) sensor, complimentary metal-oxide semiconductor (CMOS) sensor). The ISP 230 may comprise multiple sensor processing stages in hardware, including black level compensation, defective pixel correction, lens shading compensation, demosaicing, geometric distortion correction, color correction and conversion, denoising, and/or sharpening, for example. The ISP 230 may comprise a programmable pipeline structure. The flexibility of the ISP 230 enables information to be taken from anywhere in the hardware pipeline and processed using software. The resulting software processed data may then be inserted at any location into the ISP 230 for processing. The ISP 230 may comprise control logic that may be operable to communicate configuration parameters to the various processing modules of the ISP 230 as image data tiles progress through the ISP 230 and may receive processing complete signals from the processing modules of the ISP 230.

In an embodiment of the invention, the ISP 230 may comprise low-resolution resize, bilinear interpolation for coordinate interpolation, arbitrary tile sizes for improved correction accuracy, multipass processing, automatic defective pixel correction, crosstalk correction, gamma correction, and wide dynamic range support.

The hardware video accelerator 216 may comprise suitable logic, circuitry, interfaces, and/or code that may enable hardware accelerated processing of video data in any one of a plurality of video formats such as H.264, Windows Media 8/9/10 (VC-1), MPEG-1, MPEG-2, and MPEG-4, for example. For H.264, for example, the hardware video accelerator 216 may encode at full high-definition (HD) 1080p at 30 fps. For MPEG-4, for example, the hardware video acceleration 216 may encode a HD 720p at 30 fps. For H.264, VC-1, MPEG-1, MPEG-2, and MPEG-4, for example, the hardware video accelerator 216 may decode at full HD 1080p at 30 fps or better. The hardware video accelerator 216 may be operable to provide concurrent encoding and decoding for video conferencing and/or to provide concurrent decoding of two video streams for picture-in-picture applications, for example.

The 3D pipeline 218 may comprise suitable logic, circuitry, interfaces, and/or code that may be operable to provide 3D rendering operations for use in, for example, graphics applications. The 3D pipeline 218 may support OpenGL-ES 2.0, OpenGL-ES 1.1, and OpenVG 1.1, for example. The 3D pipeline 218 may comprise a multi-core programmable pixel shader, for example. The 3D pipeline 218 may be operable to handle 32M triangles-per-second (16M rendered triangles-per-second), for example. The 3D pipeline 218 may be operable to handle 1 G rendered pixels-per-second with Gouraud shading and one bi-linear filtered texture, for example. The 3D pipeline 218 may support four times (4×) full-screen anti-aliasing at full pixel rate, for example.

The 3D pipeline 218 may comprise suitable logic, circuitry, interfaces, and/or code that may be operable to control 3D pipeline 218 operations utilizing one or more control lists. For example, the control lists may define operations and primitive and/or vertex data for tile mode rendering of the primitive and/or vertex data. The tile mode rendering my comprise a coordinate shading phase which may be referred to as a binning phase and a full vertex shading phase which may be referred to as a pixel rendering phase, for example. The control lists may be generated by a host processor outside of the 3D pipeline 218 and may be read into the 3D pipeline 218. The control lists may drive hardware within the 3D pipeline 218 in order to automate control of 3D pipeline 218 operations. The control lists may control all or a large portion of the operations of the 3D pipeline 218 such that little or no interaction by a host processor may be needed after the 3D pipeline 218 begins executing based on the control lists. The control lists may comprise register settings, commands and data or pointers to data that may be utilized for vertex shading.

The JPEG endec 212 may comprise suitable logic, circuitry, interfaces, and/or code that may be operable to provide processing (e.g., encoding, decoding) of images. The encoding and decoding operations need not operate at the same rate. For example, the encoding may operate at 120M pixels-per-second and the decoding may operate at 50M pixels-per-second depending on the image compression.

The display driver and video scaler 226 may comprise suitable logic, circuitry, interfaces, and/or code that may be operable to drive the TV and/or LCD displays in the TV/LCD displays 295. Although an LCD display is shown in FIG. 2, the invention is not so limited and may comprise any suitable display type. For example, an LED display and/or a plasma display may be utilized. The display driver and video scaler 226 may output to the TV and LCD displays concurrently and in real time, for example. Moreover, the display driver and video scaler 226 may comprise suitable logic, circuitry, interfaces and/or code that may be operable to scale, transform, and/or compose multiple images. The display driver and video scaler 226 may support displays of up to full HD 1080p at 60 fps.

The display transposer 228 may comprise suitable logic, circuitry, interfaces, and/or code that may be operable for transposing output frames from the display driver and video scaler 226. The display transposer 228 may be operable to convert video to 3D texture format and/or to write back to memory to allow processed images to be stored and saved.

The secure boot 206 may comprise suitable logic, circuitry, interfaces, and/or code that may be operable to provide security and Digital Rights Management (DRM) support. The secure boot 206 may comprise a boot Read Only Memory (ROM) that may be used to provide secure root of trust. The secure boot 206 may comprise a secure random or pseudo-random number generator and/or secure (One-Time Password) OTP key or other secure key storage.

The AXI/APB bus 202 may comprise suitable logic, circuitry, interfaces, and/or interface that may be operable to provide data and/or signal transfer between various components of the video processing core 200. In the example shown in FIG. 2, the AXI/APB bus 202 may be operable to provide communication between one or more of the components the video processing core 200.

The AXI/APB bus 202 may comprise one or more buses. For example, the AXI/APB bus 202 may comprise one or more AXI-based buses and/or one or more APB-based buses. The AXI-based buses may be operable for cached and/or uncached transfer, and/or for fast peripheral transfer. The APB-based buses may be operable for slow peripheral transfer, for example. The transfer associated with the AXI/APB bus 202 may be of data and/or instructions, for example. The AXI/APB bus 202 may provide a high performance system interconnect that allows the VPU 208 and other components of the video processing core 200 to communicate efficiently with each other and with external memory.

The level 2 cache 204 may comprise suitable logic, circuitry, interfaces, and/or code that may be operable to provide caching operations in the video processing core 200. The level 2 cache 204 may be operable to support caching operations for one or more of the components of the video processing core 200. The level 2 cache 204 may complement level 1 cache and/or local memories in any one of the components of the video processing core 200. For example, when the VPU 208 comprises its own level 1 cache, the level 2 cache 204 may be used as complement. The level 2 cache 204 may comprise one or more blocks of memory. In one embodiment, the level 2 cache 204 may be a 128 kilobyte four-way set associate cache comprising four blocks of memory (e.g., Static Random Access Memory (SRAM)) of 32 kilobytes each.

The system peripherals 214 may comprise suitable logic, circuitry, interfaces, and/or code that may be operable to support applications such as, for example, audio, image, and/or video applications. In one embodiment of the invention, the system peripherals 214 may be operable to generate a random or pseudo-random number, for example. The capabilities and/or operations provided by the peripherals and interfaces 232 may be device or application specific.

In operation, the video processing core 200 may be operable to carry out a plurality of multimedia tasks simultaneously without degrading individual function performance. Furthermore, with regard to image processing, the ISP 230 may be operable to process images in a tile-by-tile format. The tile size may be variable, for example, and may each have corresponding configuration data for each of the processing modules of the ISP 230.

Control logic within the ISP 230 may be operable to communicate the configuration parameters to a processing module that will handle processing of a particular tile when that data tile is about to be communicated that module. In this manner, each processing module may process tiles with increased performance and speed characteristics as opposed to utilizing the same parameters for handling all the data that is being processed by the ISP 230. For example, lens shading parameters may be communicated to a lens shading compensation module in the ISP 230 for each tile of image data, where the lens shading may vary across the image, thereby resulting in improved lens shading compensation of the image. Similarly, extended statistics parameters may be configured for each data tile, thereby improving correction accuracy and efficiency.

Figure 2B:
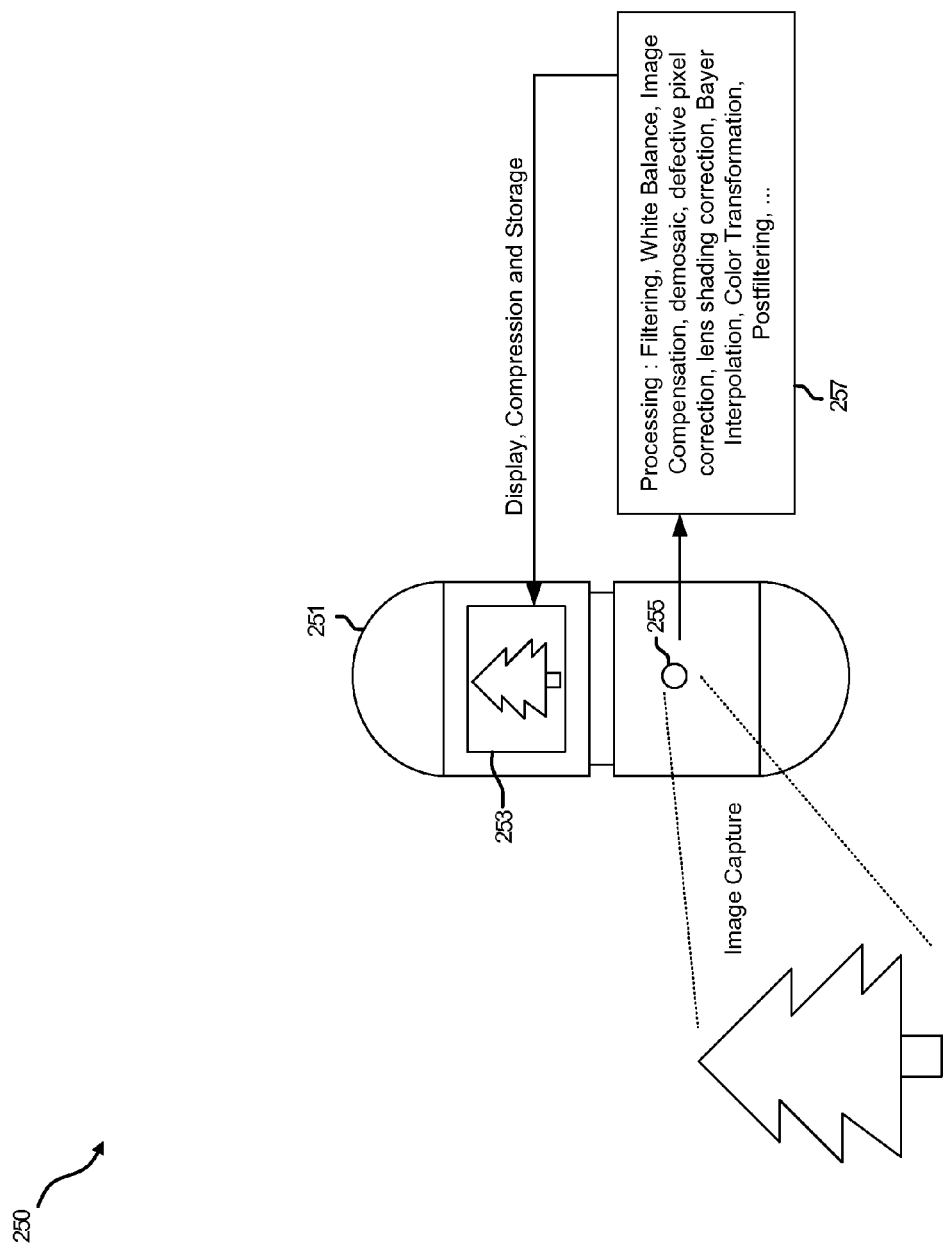
FIG. 2B is a block diagram of an exemplary application of image processing in a mobile communication device, in accordance with an embodiment of the invention.

FIG. 2B is a block diagram of an exemplary application of image processing in a mobile communication device, in accordance with an embodiment of the invention. Referring to FIG. 2B, there is shown an image processing application 250 comprising a mobile communication device 251 with a display screen 253, an image source 255 and a processing block 257. The mobile communication device 251 may comprise suitable circuitry, logic, interfaces, and/or code for communicating over a cellular network and capturing, processing, storing and/or displaying an image generated by the image source 255. The display screen 253 may comprise suitable circuitry, logic, interfaces, and/or code for displaying an image generated by the image source 255 and the processing block 257. The image source 105 may comprise a multi-megapixel CCD, CMOS or related technology sensor array that may be enabled to detect a visual image and generate digital data representing that image.

The processing block 257 may comprise suitable circuitry, logic, interfaces, and/or code that may be operable to process the image data received from the image source 255. The processing steps, or image sensor pipeline (ISP), controlled by the processing block 257 may comprise, for example, filtering, demosaic, lens shading correction, defective pixel correction, white balance, image compensation, Bayer interpolation, color transformation, and post filtering. The processing block 257 may process image data tile-by-tile, processing individual tiles as they are received. Configuration parameters for each data tile may be communicated to each applicable processing block in the ISP via tile control logic. Conventional systems may process an entire image, or a minimum number of entire lines of data, greatly increasing the memory requirements and reducing the speed of the system, especially as the number of pixels in images sensors continues to increase above ten million pixels.

In operation, the image source 255 in the mobile communication device 101 may perform an image capture. The image data may be transferred to the processor block 257 in tile format. In this manner, the processing of the data may commence before the entire image may be received, greatly increasing the speed, and reducing the memory requirements of the system. The processing may comprise filtering, white balance, lens shading correction, extended statistics, and/or image compensation, for example. The data may then be compressed, stored and/or displayed on the display screen 253.

Figure 2C:
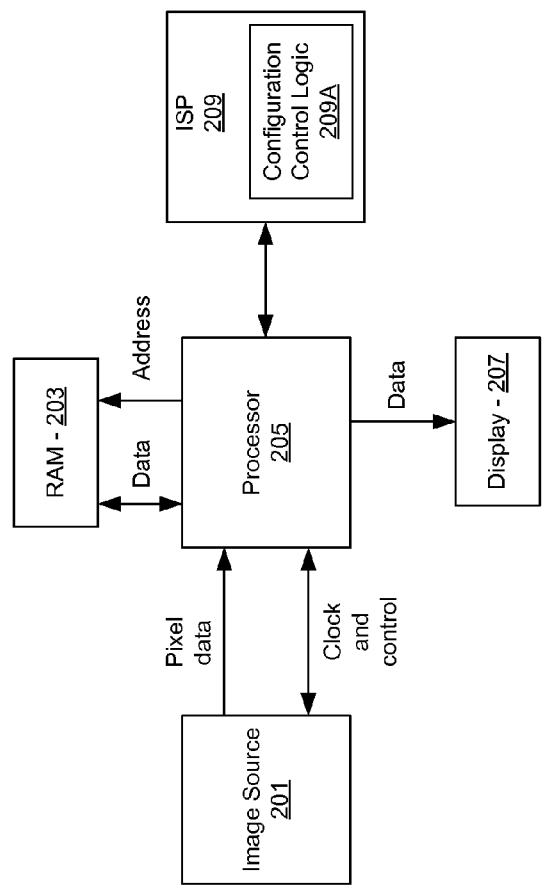
FIG. 2C is a block diagram of an exemplary tile data image processing system, in accordance with an embodiment of the invention.

FIG. 2C is a block diagram of an exemplary tile data image processing system, in accordance with an embodiment of the invention. Referring to FIG. 2C, there is shown an image processing system 260 comprising an image source 201, a RAM 203, a processor 205, a display 207 and an image sensor pipeline (ISP) 209. The ISP 209 may comprise configuration control logic 209A

The image source 201 and the display 207 may be substantially similar to the image source 255 and the display screen 253, described with respect to FIG. 2A. The RAM 203 may comprise suitable circuitry, logic and/or code for storing data. The characteristics of the image source 201 may be measured at the time of manufacture, and the distortion of the optics across a resulting image may be stored in the RAM 203.

The processor 205 may comprise suitable circuitry, logic, interfaces, and/or code that may be operable to send control signals to and receive data from the image source 201 and the RAM 203. The processor 205 may also be operable to communicate data to the display 207. The image data may be processed in variable size tiles. The size of the tiles may be determined by the distortion in the image data. Smaller sized tiles may be utilized in areas of the image where there may be higher distortion, such as around the edges, for example. The tile sizes may be determined by the distortion characteristics stored in the RAM 203.

The ISP 209 may comprise suitable circuitry, logic, interfaces and/or code that is operable to process image data generated by the image source 201. The ISP 209 may comprise separate circuitry specifically for one or more image processing tasks. The image processing tasks performed may include one or more of a group comprising filtering, demosaic, lens shading correction, defective pixel correction, white balance, image compensation, Bayer interpolation, color transformation, and/or post filtering, for example. Other processing techniques are also possible and may be performed by or in the ISP 209. Each processing task may be performed by hardware in the ISP 209, or by software stored in the RAM 203 and executed by the processor 205.

The configuration control logic 209A may comprise suitable circuitry, logic, interfaces, and/or code that may be operable to control the configuration of modules within the ISP 209 corresponding to each image data tile as it proceeds through the ISP 209. In this manner, each module may be individually configured to increase processing speed and performance.

In operation, the processor 205 may receive tiled image data from the image source 201. The processor 205 may provide clock and control signals for synchronizing the data transfer from the image source 201. The data may be processed in the ISP 209, and may be performed on tiles of data, as described further in FIG. 4B. In addition, the tile sizes may vary over the image area, with smaller tile sizes in regions where more distortion may be present due to the optics, for example.

The data may be stored in the RAM 203 prior to being communicated to the display 207. The processor 205 may communicate address data to the RAM 203 to determine where to read or write data in the RAM 203. Since the image processing may commence when the first tile may be received, as opposed to after the entire image file or a number of entire lines of data in conventional systems, the time required to process an entire image may be significantly reduced. Additionally, memory requirements may be reduced since large memory buffers may not be required for image tiles, in contrast to conventional systems which process multiple entire rows of data from an image, generating large amounts of data to be stored in buffers.

In addition, configuration data for each processing module in the ISP 230 that processes the image data tile may be communicated to the processing module utilizing the configuration control logic 209. In this manner, processing parameters may be communicated for each image data tile, depending on the required processing, such as lens shading, extended statistics, and distortion correction, for example.

Figure 3:
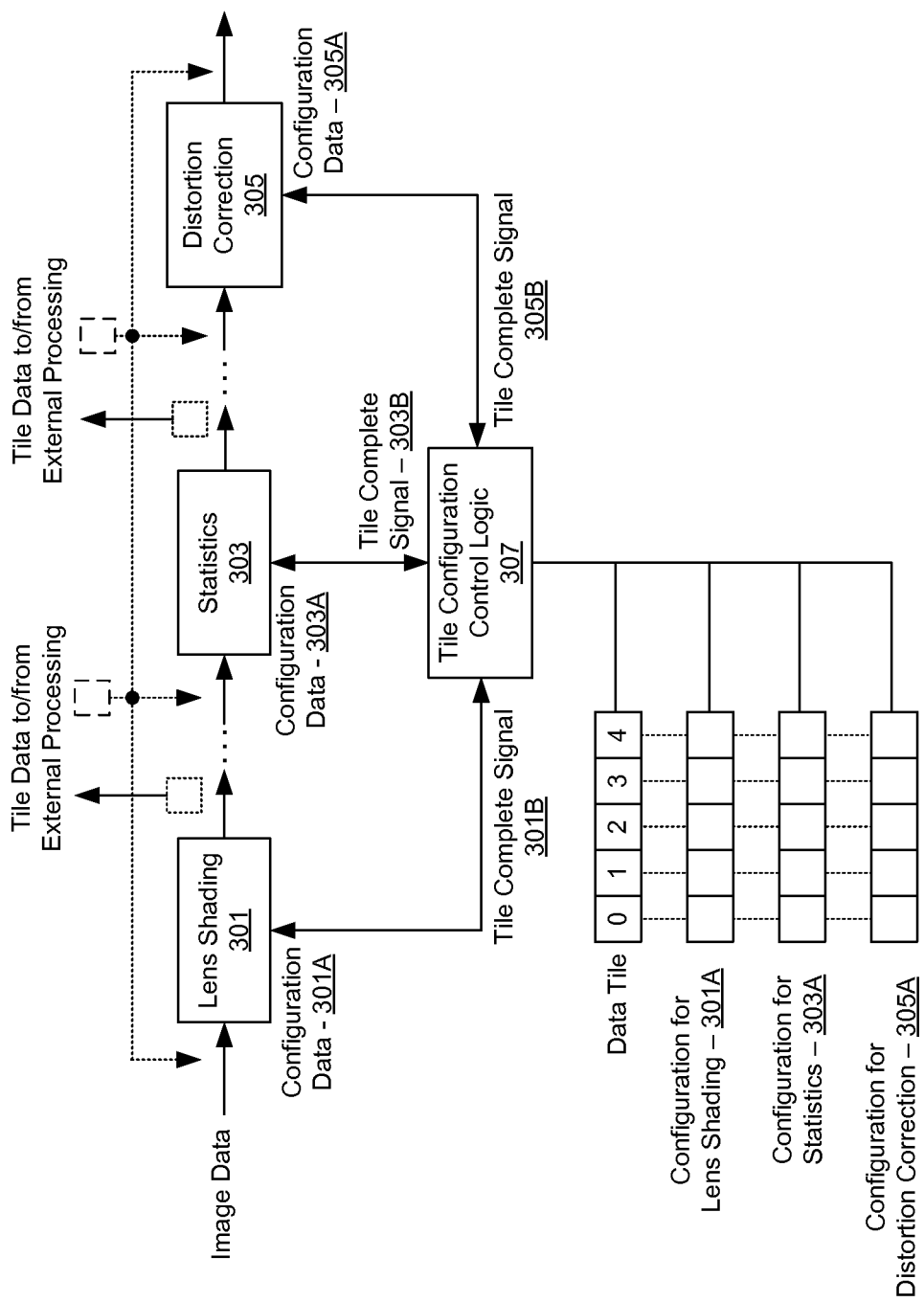
FIG. 3 is a block diagram illustrating an exemplary image sensor pipeline with per tile processing, in accordance with an embodiment of the invention

FIG. 3 is a block diagram illustrating an exemplary image sensor pipeline with per tile processing, in accordance with an embodiment of the invention. Referring to FIG. 3, there is shown an image sensor pipeline (ISP) 300 comprising a lens shading module 301, a statistics module 303, a distortion correction module 305, and tile configuration control logic 307. There is also shown configuration data signals 301A, 303A, and 305A, and tile complete signals 301B, 303B, and 303C. The number of modules in the image sensor pipeline 300 is not limited to the number shown. Accordingly, any number of processing modules may be utilized depending on the desired processing capability and space requirements, for example.

The lens shading module 301 may comprise suitable circuitry, logic, interfaces, and/or code that may be operable to compensate for lens shading artifacts in received image data by applying a gain to each pixel data point based on its coordinate in the image. The lens shading module may also be operable to receive configuration parameters 301A from the tile configuration control logic 307, depending on the type and amount of lens shading artifacts in the received image data, and return a tile complete signal 301B to the tile configuration control logic 307.

The statistics module 303 may comprise suitable circuitry, logic, interfaces, and/or code that may be operable to determine statistics of the received image data tile, such as red/green and blue/green values before a histogram operation, rectangle offsets in number of pixels, bitmask data, focus filter coefficients, filter gains, filter thresholds, and red/green/blue thresholds, for example. The statistics module 303 may be operable to receive configuration parameters 303A from the tile configuration control logic 307 that may control settings used in determining the statistics of the received image data. The statistics module may also be operable to communicate a tile complete signal 303B to the tile configuration control logic 307 when the statistics processing is complete.

The distortion correction module 305 may comprise suitable circuitry, logic, interfaces, and/or code that may be operable to provide compensation for distortion in image data on a per tile basis. For example, in instances where the optics in the built-in camera in a mobile communication device is not of high quality, such as in low-cost cell phones, the images generated by the built-in camera may be distorted. The distortion correction module 305 may receive as inputs, image data tiles from prior processing modules in the ISP 300 and also configuration parameters 305A received from the tile configuration control logic 307. The configuration parameters 305A may specify the expected amount of distortion for which compensation should be provided, based on what part of the optics may have generated the particular data tile, for example.

The tile configuration control logic 307 may comprise suitable circuitry, logic, interfaces, and/or code that may be operable to communicate configuration parameters 301A, 303A, and 305A to the various processing modules of the ISP 300. The tile configuration control logic 307 may also receive tile complete signals 301B, 303B, and/or 305B back from the processing modules when the modules have completed processing a tile so that the configuration parameters for the next data tile may be communicated to the processing module. The data tiles and corresponding configuration parameters 301A, 303A, and 303C are shown schematically in FIG. 3 by the tile data blocks labeled 0-4 and the configuration blocks below each data tile block.

In operation, the tile configuration control logic 307 may communicate the lens shading parameters 301A for the image data tile 0 to the lens shading module 301. The data tile 0 may then be communicated to the lens shading module 301 for lens shading correction processing. Soon after processing has commenced on the image data tile 0, the statistics module 303 may begin processing on the image data tile 0, soon after which the distortion correction module 305 may begin processing on the image date tile 0. In this manner, each module may operate on a tile concurrently, thereby reducing storage requirements in the ISP 300.

When the processing is complete, tile complete signals 301B, 303B, and 305B may be communicated back to the tile configuration control logic 307, which may then communicate statistics parameters 301A, 303A, and 305A to the lens shading module 301, the statistics module 303, and the distortion correction module 305 for the data tile 1 to be processed by the modules. In this manner, data tiles of an image may be processed concurrently in a plurality of processing modules with configurable parameters which increase image quality and processing speed, for example.

Although FIG. 3 illustrates sequential processing of the tiles by the processing modules in the ISP 300, the invention is not so limited. In this regard, a tile may be removed from any point in the ISP, as illustrated by the "Tile Data to/from External Processing" shown in FIG. 3, and communicated to one or more hardware and/or software processing modules that are external to the ISP 300 for additional processing. Upon completion of the additional processing by the external hardware and/or software processing modules, the resulting processed tile may be reinserted at any point in the ISP 300 for further processing. Accordingly, corresponding configuration parameters may be communicated to appropriate processing modules to ensure that the data tile is optimally processed, regardless of whether it is being processed within the ISP 300 or external to the ISP 300. The configuration control logic 307 may be operable to handle the communication of the corresponding configuration parameters to the appropriate processing modules.

Figure 4A:
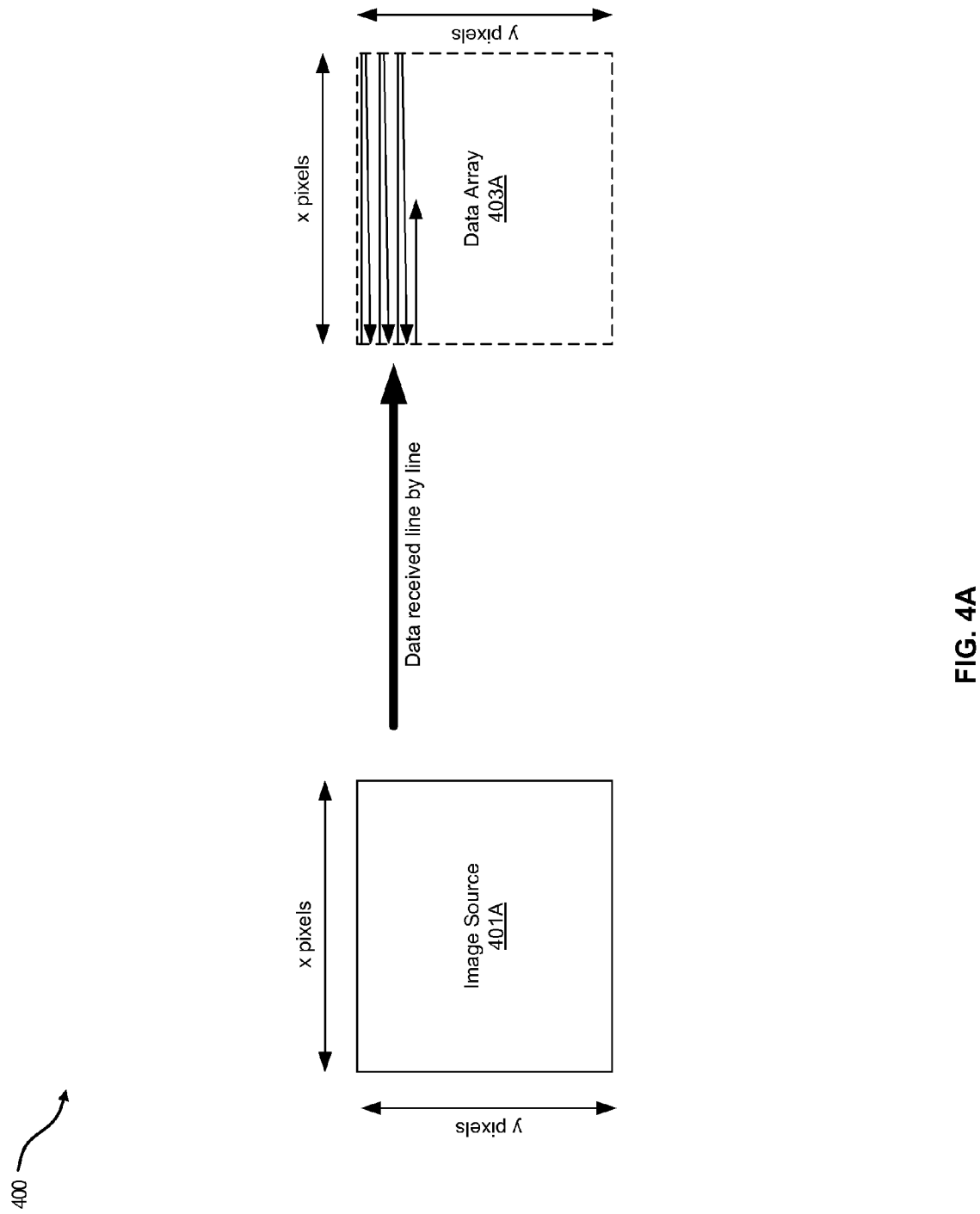
FIG. 4 is a block diagram of an exemplary tiled image data array, in accordance with an embodiment of the invention.

FIG. 4A is a block diagram of an exemplary linear data transfer to an image processor in a conventional system, in connection with an embodiment of the invention. Referring to FIG. 4A, there is shown an image source 401A and an image data array 403A. The image source 401A may be comprise a conventional imaging sensor, for example. The image data array 403A may comprise a data array with x columns and y rows of data, where x may be the number of pixels in the horizontal direction and y may be the number of pixels in the vertical direction.

In operation, the data from an image capture may be communicated to the image source 403A one line at a time. Each pixel data of a row may be transferred before the next row of data may be transferred. Because image processing techniques may be performed on two-dimensional blocks of data, the lines of data communicated from the image source 401A may be stored in a processor buffer or external memory until enough rows, at least 16, for example, have been read out to fill a row of processing blocks. When enough rows have been read out, a processor, may begin processing the data. As the number of pixels in image sensors continues to increase, this row storage may place excessive memory requirements on the system, which may be very undesirable in a handheld device, especially if cost is an important feature. In addition, since more data may be read out and stored in a buffer than what may be needed to start processing the first block, the speed of the system may be reduced.

Figure 4B:
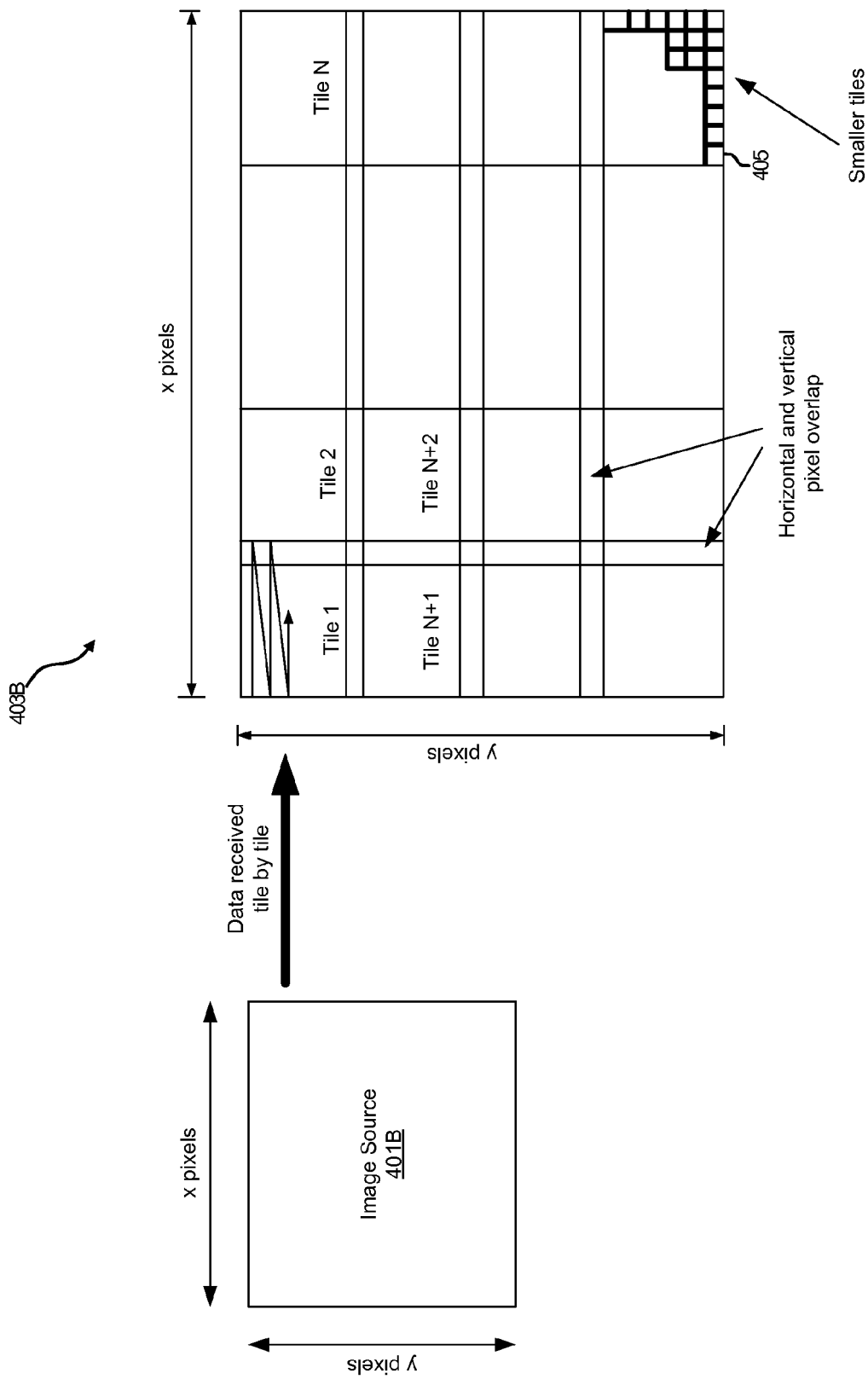

FIG. 4B is a block diagram of an exemplary tiled image data array, in accordance with an embodiment of the invention. Referring to FIG. 4B, there is shown an image source 401 and an image data array 403. The image source 401B may comprise a multi-megapixel CCD, CMOS or related technology sensor array, for example, that may be enabled to detect a visual image and generate digital data representing that image.

The data from the image source 401B may be received in tile format, as opposed to line-by-line. In this regard, the tiles or blocks of pixels may be addressed individually, as opposed to lines of pixels, which may greatly increase speed and reduce memory requirements of the image processing. In addition, image processing modules may be individually configured to process the received data tile with increased quality and/or speed, for example, for that particular tile. The image source 401B may be from a cellular phone, a digital camera, a portable multimedia device, or any system incorporating an image sensor, for example.

The image data array 403B may comprise a data array with x columns and y rows of data, where x may be the number of pixels in the horizontal direction and y may be the number of pixels in the vertical direction. The image data array 403B may comprise a number of tiles of a variable width and height. For example, smaller tiles, as shown by the small tile 405 and similar adjacent tiles in the corner of the array, may be utilized in regions where the distortion in the image may be greater. Increased distortion may be due to imperfections in the optics, for example, of the image sensing system utilized to generate the image source 401B. Each tile may overlap with neighboring tiles by a variable number of pixels, up to 64 for example, to reduce edge effects in the processing of adjacent tiles. The overlap of the smaller tiles in FIG. 4BB is represented by thicker lines.

In operation, image data may be received from the image source 401B one block at a time. In this manner, the memory requirements in processing the data may be reduced since less than a single tile may require storage in a buffer before the data may be processed by a processor enabled to handle data in the appropriate tile size. The processing may comprise filtering, demosaic, lens shading correction, defective pixel correction, white balance, image compensation, Bayer interpolation, color transformation and post filtering, for example. The processing modules for the image data tiles may be configured separately for each tile with the processing modules configured by control logic, such as the tile configuration control logic 307, described with respect to FIG. 3.

The data may be communicated to a display and/or compressed into JPEG, MPEG, or other format and stored in memory. In this manner, the memory requirements may be reduced and the speed may be increased, since the processing of the data may commence as soon as a single tile may be communicated from the image sensor, as opposed to a number of entire rows in a conventional design. Also, the amount of local memory in the processor, or cache, and the data traffic between the processor and the memory may be reduced due to the small size of the tile, as compared to the conventional process where data may be stored in RAM due to the large size of data from multiple rows.

The size of the image tiles may be variable across the image data array 403B. For example, in areas of the image data where distortion may be higher, due to the image sensor optics, for example, the tile size may be reduced for more accurate image processing. Conversely, in regions of the image data where the distortion may be low, such as in the center, for example, the tile size may be larger for more efficient and higher speed image processing.

Figure 5:
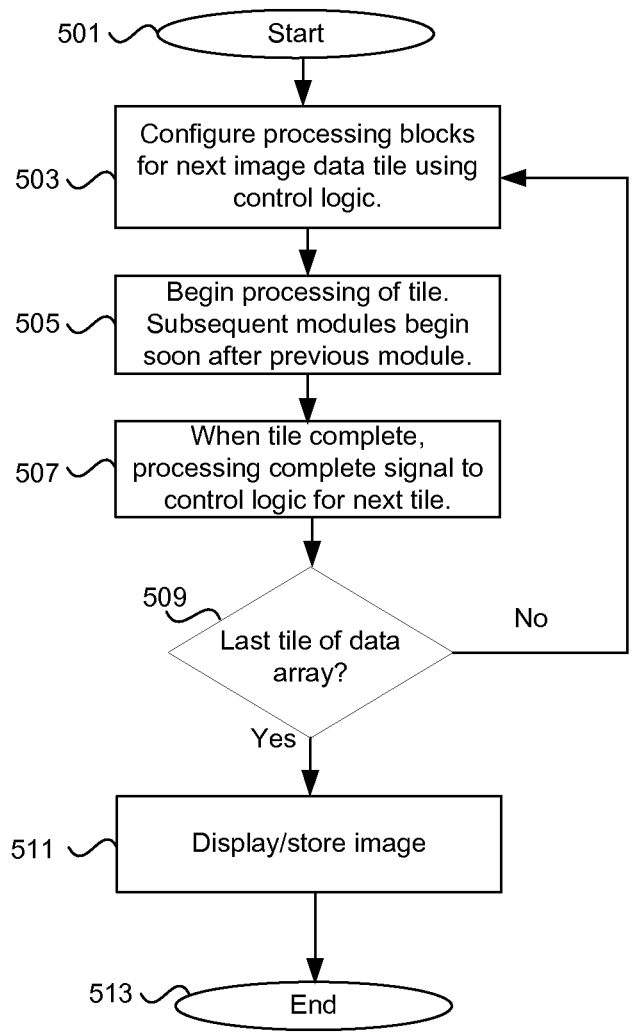
FIG. 5 is a flow diagram illustrating an exemplary process for image processing.

FIG. 5 is a flow diagram illustrating an exemplary process for image processing on a per tile basis. Referring to FIG. 5, following start step 501, in step 503 image data tile processing modules may be configured for the particular tile to be processed next using control logic. In step 505, the processing of the data tile may begin utilizing the ISP processing module with techniques such as filtering, demosaic, lens shading correction, defective pixel correction, statistics, distortion correction, white balance, image compensation, Bayer interpolation, color transformation and post filtering, for example. The processing of the data tile may begin in the next ISP processing module, and continue for each desired processing module. In this manner, a plurality of processing modules may be processing a data tile concurrently. In step 507, when the processing of the data tile is complete, processing complete signals may be communicated from the processing modules to the control logic to enable the processing of the next tile. In step 509, if the processed tile in the last ISP processing module may be the last tile of the data array, the process may proceed to step 511 where the image may be displayed or stored, followed by end step 513. If, in step 509, the processed tile in the last ISP processing module may not be the last tile, the process may proceed to step 503, where the next data tile may be received by the processor 205. This loop may repeat until the final data tile may be processed and stored/displayed in step 511.

In an embodiment of the invention, a method and system are provided for communicating, to one or more processing modules 301, 303, and/or 305 via control logic circuits 103B, 209A, and/or 307 integrated in the ISP 103C, 209, 230, and 300, corresponding configuration parameters 301A, 303A, and/or 305A that are associated with each one of a plurality of data tiles 0-4 comprising an image 201, 401B. Each of the plurality of data tiles may be processed utilizing corresponding configuration parameters. The ISP 103C, 209, 230, and 300 may be integrated in a chip 102, wherein the ISP 103C, 209, 230, and 300 may comprise control logic circuits 103C, 209, 230, and 300 and one or more image processing modules 301, 303, and/or 305 that are communicatively coupled to the control logic circuits 103C, 209, 230, and 300. The ISP 103C, 209, 230, and 300 may be integrated in a video processing core 103. The plurality of data tiles may vary in size. A processing complete signal 301B, 303B, and/or 303C may be communicated to the control logic circuits 103B, 209A, and/or 307 when the processing of the each one of the plurality of data tiles is complete prior to configuring a subsequent processing module 301, 303, and/or 305. The processing may comprise one or more of: lens shading correction, statistics, distortion correction, demosaicing, denoising, defective pixel correction, color correction, and resizing. Each of the plurality of data tiles may overlap with adjacent data tiles. At least a portion of the plurality of data tiles may be processed concurrently. A portion of the plurality of data tiles may be communicated to one or more processing modules external to the ISP 103C, 209, 230, and 300 for further processing by hardware and/or software, and may then be reinserted into the ISP 103C, 209, 230, and 300 at any point in the ISP 103C, 209, 230, and 300 independent of where the tile was communicated from in the ISP 103C, 209, 230, and 300.

Other embodiments of the invention may provide a non-transitory computer readable medium and/or storage medium, and/or a non-transitory machine readable medium and/or storage medium, having stored thereon, a machine code and/or a computer program having at least one code section executable by a machine and/or a computer, thereby causing the machine and/or computer to perform the steps as described herein for processing image data on a per tile basis in an image sensor pipeline.

Accordingly, aspects of the invention may be realized in hardware, software, firmware or a combination thereof. The invention may be realized in a centralized fashion in at least one computer system or in a distributed fashion where different elements are spread across several interconnected computer systems. Any kind of computer system or other apparatus adapted for carrying out the methods described herein is suited. A typical combination of hardware, software and firmware may be a general-purpose computer system with a computer program that, when being loaded and executed, controls the computer system such that it carries out the methods described herein.

One embodiment of the present invention may be implemented as a board level product, as a single chip, application specific integrated circuit (ASIC), or with varying levels integrated on a single chip with other portions of the system as separate components. The degree of integration of the system will primarily be determined by speed and cost considerations. Because of the sophisticated nature of modern processors, it is possible to utilize a commercially available processor, which may be implemented external to an ASIC implementation of the present system. Alternatively, if the processor is available as an ASIC core or logic block, then the commercially available processor may be implemented as part of an ASIC device with various functions implemented as firmware.

The present invention may also be embedded in a computer program product, which comprises all the features enabling the implementation of the methods described herein, and which when loaded in a computer system is able to carry out these methods. Computer program in the present context may mean, for example, any expression, in any language, code or notation, of a set of instructions intended to cause a system having an information processing capability to perform a particular function either directly or after either or both of the following: a) conversion to another language, code or notation; b) reproduction in a different material form. However, other meanings of computer program within the understanding of those skilled in the art are also contemplated by the present invention.

While the invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiments disclosed, but that the present invention will include all embodiments falling within the scope of the appended claims.

What is claimed is:

1. A method for processing images, the method comprising:
   in a chip comprising an image sensor pipeline (ISP), said ISP comprising one or more control logic circuits and one or more image processing modules, wherein said ISP, said one or more control logic circuits, and said one or more image processing modules are integrated on a single substrate of said chip:
   communicating, to said one or more processing modules via said one or more control logic circuits, corresponding configuration parameters that are associated with each one of a plurality of data tiles comprising an image, as each data tile progresses through said ISP; and
   processing said each one of said plurality of data tiles by said one or more image processing modules concurrently, wherein each image processing module of said one or more image processing modules performs a different function, and wherein said each image processing module processes said each one of said plurality of data tiles by utilizing said corresponding configuration parameters associated with said each one of said plurality of data tiles.

2. The method according to claim 1, wherein said ISP is integrated in a video processing core.

3. The method according to claim 1, wherein said plurality of data tiles vary in size.

4. The method according to claim 1, comprising receiving, a processing complete signal at said one or more control logic circuits, from an image processing module of said one or more image processing modules, when said processing of said each one of said plurality of data tiles is completed by each of said configured processing modules, and
communicating, to said image processing module, in response to said processing complete signal, configuration parameters for a next data tile of said image.

5. The method according to claim 1, wherein said processing comprises one or more of: lens shading correction, statistics, distortion correction, demosaicing, denoising, defective pixel correction, color correction, and resizing.

6. The method according to claim 1, wherein each of said plurality of data tiles overlaps with adjacent data tiles.

7. The method according to claim 1, comprising concurrently processing at least a portion of said plurality of data tiles.

8. The method according to claim 1, comprising communicating a portion of said processed plurality of data tiles to at least one module that is external to said ISP for further processing in hardware and/or software.

9. The method according to claim 8, comprising reinserting in said ISP, a version of said at least a portion of plurality of data tiles that has been further processed by said at least one processing module that is external to said ISP.

10. The method according to claim 9, comprising processing said version of said at least a portion of said plurality of data tiles by any of said one or more image processing modules regardless of which of said one or more image processing modules in said ISP was the last to process said portion of said processed plurality of data tiles before said at least a portion of said plurality of data tiles was communicated to said at least one processing module that is external to said ISP.

11. A system for processing images, the system comprising:
one or more circuits in a chip, said one or more circuits comprising an image sensor pipeline (ISP), said ISP comprising one or more control logic circuits and one or more image processing modules that are communicatively coupled to said one or more control logic circuits, wherein said ISP, said one or more control logic circuits, and said one or more image processing modules are integrated on a singe substrate of said chip, and said one or more circuits are operable to:
communicate, to said one or more processing modules via said one or more control logic circuits, corresponding configuration parameters that are associated with each one of a plurality of data tiles comprising an image as each data tile progresses through the image sensor pipeline; and
process said each one of said plurality of data tiles by said one or more image processing modules utilizing said corresponding configuration parameters in respective processing steps for said each one of said plurality of data tiles, wherein said one or more image processing modules are operable concurrently, and wherein each of said one or more image processing module performs a different image processing function.

12. The system according to claim 11, wherein said ISP is integrated in a video processing core.

13. The system according to claim 11, wherein said plurality of data tiles vary in size.

14. The system according to claim 11, wherein said one or more circuits are operable to communicate a processing complete signal to said one or more control logic circuits when said processing of said each one of said plurality of data tiles is completed by each of said configured processing modules, and prior to configuring said one or more processing modules for a next data tile.

15. The system according to claim 11, wherein said processing comprises one or more of: lens shading correction, statistics, distortion correction, demosaicing, denoising, defective pixel correction, color correction, and resizing.

16. The system according to claim 11, wherein each of said plurality of data tiles overlaps with adjacent data tiles.

17. The system according to claim 11, wherein said one or more circuits are operable to communicate a portion of said processed plurality of data tiles to at least one module that is external to said ISP for further processing in hardware and/or software.

18. The system according to claim 17, wherein said one or more circuits are operable to receive from said at least one module that is external to said ISP, a version of said at least a portion of plurality of data tiles that has been further processed by said at least one module that is external to said ISP.

19. The system according to claim 17, wherein said one or more circuits are operable to process said received version of said at least a portion of said plurality of data tiles by any of said one or more image processing modules regardless of which of said one or more image processing modules in said ISP was the last to process said portion of said processed plurality of data tiles before said at least a portion of said plurality of data tiles was communicated to said at least one module that is external to said ISP.

20. A method for processing images, the method comprising:
in a chip comprising an image sensor pipeline (ISP), said ISP comprising one or more control logic circuits and a plurality of processing modules that are communicatively coupled to said one or more control logic circuits, wherein said ISP, said one or more control logic circuits, and said plurality of processing modules are integrated on a single substrate of said chip:
communicating, to said plurality of processing modules via said one or more control logic circuits, corresponding configuration parameters that are associated with each one of a plurality of data tiles comprising an image as each data tile progresses through said ISP; and
processing said each one of said plurality of data tiles utilizing said corresponding configuration parameters, wherein said processing comprises concurrently processing a data tile of said plurality of data tiles by said plurality of processing modules, wherein each of said plurality of processing modules performs separate processing steps.

21. A method for processing images, the method comprising:
in a chip comprising an image sensor pipeline (ISP), said ISP comprising one or more control logic circuits and one or more image processing modules that are communicatively coupled to said one or more control logic circuits, wherein said ISP, said one or more control logic circuits, and said one or more image processing modules are integrated on a single substrate of said chip:
communicating, to said one or more processing modules via said one or more control logic circuits, corresponding configuration parameters that are respectively associated with each one of a plurality of data tiles comprising an image as each data tile progresses through the image sensor pipeline, wherein said communicating of said corresponding configuration parameters occurs before said associated each data tile is about to be communicated to said one or more image processing modules; and processing said each one of said plurality of data tiles by said one or more image processing modules utilizing said corresponding configuration parameters.

22. The method according to claim 20, wherein said processing steps performed by said each of said plurality of processing modules comprises one or more of lens shading correction, statistics, distortion correction, demosaicing, denoising, defective pixel correction, color correction, and resizing.

* * * * *